(12) United States Patent
Nielsen (10) Patent No.: US 10,379,211 B2
(45) Date of Patent: Aug. 13, 2019

(54) FREQUENCY SET QUALITY MEASURE

(71) Applicant: Weibel Scientific A/S, Allerød (DK)

(72) Inventor: Jens Jørgen Nielsen, Hørsholm (DK)

(73) Assignee: Weibel Scientific A/S, Horsholm (DK)

(*) Notice: Subject to any disclaimer, the term of this patent is extended or adjusted under 35 U.S.C. 154(b) by 314 days.

(21) Appl. No.: 15/123,209

(22) PCT Filed: Sep. 11, 2015

(86) PCT No.: PCT/DK2015/050046
§ 371 (c)(1),
(2) Date: Sep. 1, 2016

(87) PCT Pub. No.: WO2015/131907
PCT Pub. Date: Sep. 11, 2015

(65) Prior Publication Data
US 2017/0067989 A1    Mar. 9, 2017

(30) Foreign Application Priority Data

Mar. 6, 2014  (DK) ................................ 2014 70109

(51) Int. Cl.
*G01S 13/36*    (2006.01)
*G01S 17/36*    (2006.01)
(Continued)

(52) U.S. Cl.
CPC ............... *G01S 13/36* (2013.01); *G01S 7/40* (2013.01); *G01S 13/38* (2013.01); *G01S 17/36* (2013.01)

(58) Field of Classification Search
CPC .......... G01S 13/36; G01S 13/38; G01S 17/36; G01S 7/40
(Continued)

(56) References Cited

U.S. PATENT DOCUMENTS

| 4,537,502 A | 8/1985 | Miller et al. |
| 6,023,238 A | 2/2000 | Cornic et al. |
(Continued)

FOREIGN PATENT DOCUMENTS

| DE | 102013207652 A1 | 11/2013 |
| EP | 2680032 A1 | 1/2014 |
(Continued)

OTHER PUBLICATIONS

International Search Report and Written Opinion, from PCT/DK2015/050046 with an international filed of Mar. 4, 2015, dated May 20, 2015, 10 pgs., European Patent Office, Rijswijk, The Netherlands.
(Continued)

*Primary Examiner* — Timothy A Brainard
(74) *Attorney, Agent, or Firm* — Baker Hostetler (57) ABSTRACT

Disclosed is a method for generating a quality measure for a frequency set. The quality measure indicates the quality of the frequency set for use in a multi frequency ranging method for estimating the range to an object. The method for generating a quality measure comprises the steps of determining the smallest distance between any two range lines of a set of range lines in an N-dimensional phase space. The N-dimensional phase space comprises at least a first dimension representing a first phase difference, and a second dimension representing a second phase difference. The N-dimensional phase space has a dimension equal to the number of phase differences used by the multi frequency ranging method. The range lines represent all theoretical possible combinations of the phase differences. The quality measure is determined for the frequency set based on the determined smallest distance

13 Claims, 6 Drawing Sheets

(51) Int. Cl.
*G01S 7/40* (2006.01)
*G01S 13/38* (2006.01)

(58) Field of Classification Search
USPC .......................................................... 342/127
See application file for complete search history.

(56) References Cited

U.S. PATENT DOCUMENTS

| | | |
|---|---|---|
| 2007/0024487 A1 | 2/2007 | Zemany et al. |
| 2010/0103020 A1 | 4/2010 | Wu |
| 2010/0265489 A1 | 10/2010 | Seeger |
| 2011/0043407 A1 | 2/2011 | Moshfeghi |
| 2011/0193738 A1 | 8/2011 | Comic et al. |
| 2013/0094560 A1 | 4/2013 | Ezaki et al. |
| 2013/0281038 A1 | 10/2013 | Ezaki |

| | | | |
|---|---|---|---|
| 2014/0321586 A1* | 10/2014 | Lee | ....................... H04L 7/0037 375/362 |

FOREIGN PATENT DOCUMENTS

| | | |
|---|---|---|
| FR | 2969306 B1 | 12/2012 |
| JP | 2008-045940 A | 2/2008 |
| KR | 100910381 B1 | 8/2009 |
| WO | 2004053521 A1 | 6/2004 |
| WO | 2005104417 A2 | 3/2005 |

OTHER PUBLICATIONS

International Search Report and Written Opinion, from PCT/DK2015/050045 with an international filing date of Mar. 4, 2015, dated May 20, 2015, 10 pgs., European Patent Office, Rijswijk, The Netherlands.

* cited by examiner

FREQUENCY SET QUALITY MEASURE

CROSS-REFERENCE TO RELATED APPLICATIONS

This application is a national stage of international application no. PCT/DK2015/050046, filed Mar. 4, 2015, which claims priority to Denmark Patent Application No. 2014 70109, filed Mar. 6, 2014, the disclosures of which are incorporated herein by reference in their entirety.

FIELD

The present invention relates to a method for generating a quality measure for a frequency set, said quality measure indicates the quality of said frequency set for use in a multi frequency ranging method. Additionally, the invention relates to a device utilizing such a quality measure.

BACKGROUND

Range estimation is used for a large number of application such as aerospace, defence, forensic science and automotive applications. The range may be estimated using transit time estimation of a transmitted signal, frequency comparison between a transmitted frequency modulated signal and the received echo, and multi frequency ranging.

Multi frequency ranging has the advantage that the range to an object can be determined with high accuracy without the need of complicated high precision timing equipment needed for transit time methods.

A Multi frequency ranging system transmits a signal comprising a primary frequency and a secondary frequency. The signal hits an object and the system receiver picks up the reflected signal. The relative phase, or the phase difference, between the primary frequency and the secondary frequency in the signal received by the system may be measured continuously. As the range increases the phase difference increases linearly modulo 360 degrees, with a slope proportional to the frequency difference between the primary frequency and the secondary frequency. This relation between the object range and the phase difference between two reflected signals is the basis for the multi frequency ranging technique.

In the case of a single secondary frequency the unambiguous range is limited to $\lambda 1 = c/2(f1-f0)$, where F0 is the primary frequency, F1 is the secondary frequency, and c is the speed of the signal in the medium in which it propagates in e.g. the speed of light for an RF signal. This means that range values offset by an integer number of $\lambda 1$ yields exactly the same phase difference.

The ambiguity is inversely proportional to the frequency difference, so by decreasing the distance between F1 and F0 the unambiguous range can be increased. However, range detection systems typically rely on filters protecting each receiver from being saturated by the adjacent carriers. Typically for radars, it is not feasible for F0 and F1 to be closer than approximately 800 kHz. Even if the filtering problem was solved, a small frequency difference yields a very noisy range measurement. Further, the difference between the frequencies has to be large enough to take an unknown Doppler frequency offset into account.

US20100103020 discloses a method of detecting a moving target within a predefined protected region with a microwave motion detector, by transmitting microwave frequency signals and receiving the microwave frequency signals reflected by a target. To determine the target distance without ambiguity, three or more microwave frequency signals may be transmitted at different frequencies.

In particular, the step of determining phase angles from the sampled intermediate frequency signal components comprises determining a first, second, and third phase from the sampled intermediate frequency signal components; the step of determining a phase difference between the phase comprises determining a first phase difference between the second phase and the first phase, and determining a second phase difference between the third phase and the first phase; and the step of determining, from the phase difference, a corresponding target distance measurement comprises: for each of the first and second phase differences, determining two corresponding distance measurements, wherein one distance measurement is a true distance measurement and the other distance measurement is an ambiguous distance measurement, and selecting an accurate distance measurement by matching the common true distance measurement of each phase difference.

Consequently, the unambiguous range can be increased.

However, in the presence of noise there exists the risk that an ambiguous range is selected as the true range. For an operator tracking the range to an object over time, this is perceived as a "range jump" e.g. the range to the object "jumps" from the true range to an "ambiguous" range or vice versa.

The risk of that happening depends on the chosen frequency set.

Thus it remains a problem to provide a method for evaluating the quality of frequency sets. Further, it remains a problem to provide a method for selecting a suitable frequency set, and a device configured to estimate the range to an object using a high quality frequency set.

SUMMARY

According to a first aspect, the invention relates to a method for generating a quality measure for a frequency set for indicating the quality of said frequency set for use in a multi frequency ranging method, said frequency set comprising at least a primary frequency (F0), a first frequency (F1), and a second frequency (F2), said multi frequency ranging method being a method for estimating the range to an object by determining at least a first phase difference and a second phase difference in a received reflected echo signal and processing said first phase difference and said second phase difference, said first phase difference being the phase difference between the primary frequency (F0') and the first frequency (F1') in the received reflected echo signal and said second phase difference being the phase difference between the primary frequency (F0') and the second frequency (F2') in the received reflected echo signal, wherein said method for generating a quality measure comprises the steps of:

determining the smallest distance between any two range lines of a set of range lines in an N-dimensional phase space, wherein the N-dimensional phase space comprises at least a first dimension representing the first phase difference, and a second dimension representing the second phase difference, said N-dimensional phase space having a dimension equal to the number of phase differences used by the multi frequency ranging method, said range lines representing all theoretical possible combinations of the first phase difference, the second phase difference, and potential further phase differences, used by said multi frequency method, each point on a range line corresponding to a specific range to an object within the unambiguous range of the multi frequency ranging method;

determining a quality measure for said specific frequency set based on the determined smallest distance.

Consequently, by using the distance between the range lines to determine a quality measure a precise way of evaluating the quality of a frequency set is provided. This is especially beneficial for evaluating frequency sets comprising many frequencies, as it becomes difficult to predict their quality.

A multi frequency ranging method is in this disclosure defined as any method comprising the steps of:

transmitting a first signal towards the object comprising a primary frequency (F0) and at least two secondary frequencies (F1, F2);

receiving a echo signal reflected from and object, the echo signal comprising the primary frequency (F0') and the two secondary frequencies (F1',F2')(possibly Doppler shifted if the object is moving relative to the transmitter/receiver as indicated by the apostrophes);

determining a first phase difference descriptive of the phase difference between the primary frequency (F0') and a first secondary frequency (F1'), and a second phase difference descriptive of the phase difference between the primary frequency (F0') and the second secondary frequency (F2') by processing said received reflected echo signal; and determining a range to the object by processing said first phase difference and said second phase difference.

The quality measure may be the determined minimum distance itself or it may be calculated using an algorithm taking the minimum distance as an input. If noise in the measured phase differences result in a measured point in the phase space being closer to a "wrong" range line than the "true" range line, an ambiguous range will be estimated and not the true range. This will be perceived as a range jump. Consequently, if the distance between the range lines is "low" the risk of range jumps will become high compared to the situation when the distance between the range lines is "high". Thus, the quality measure is a measure of the risk of range jumps i.e. the risk than an ambiguous range is selected as the true range.

Figure 6:
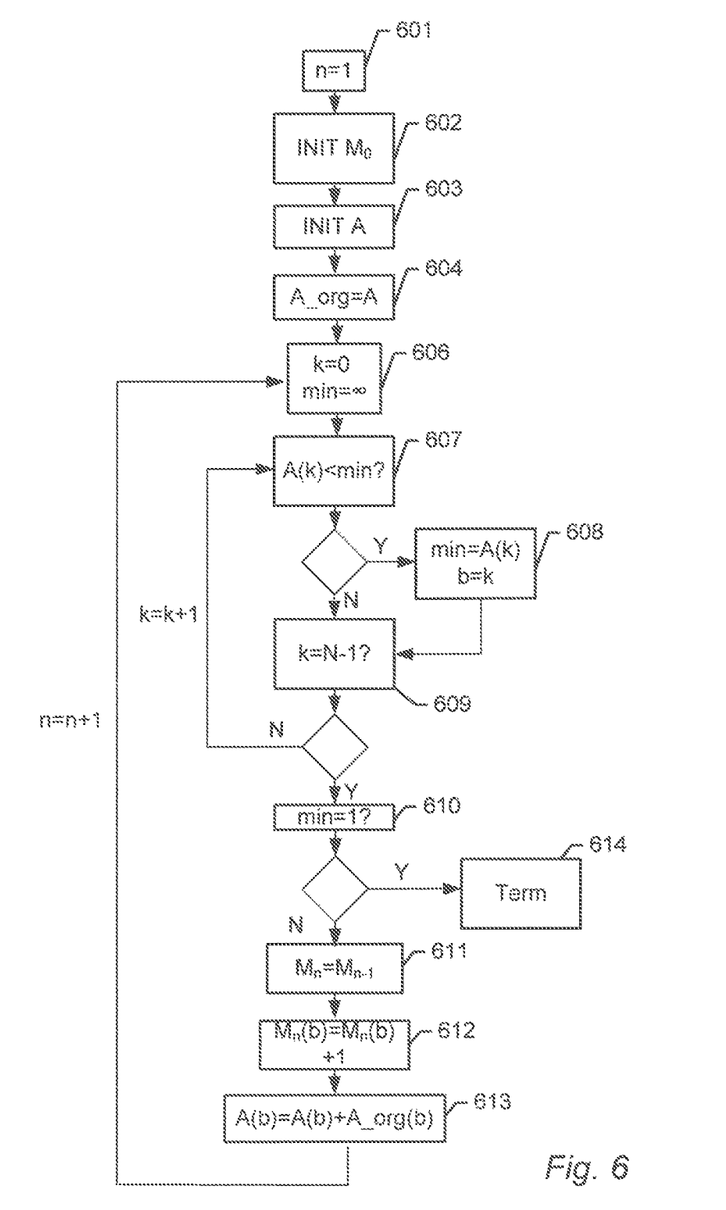
FIG. 6 shows a flowchart of a method for generating M vectors according to an embodiment of the present invention.
Figure 7:
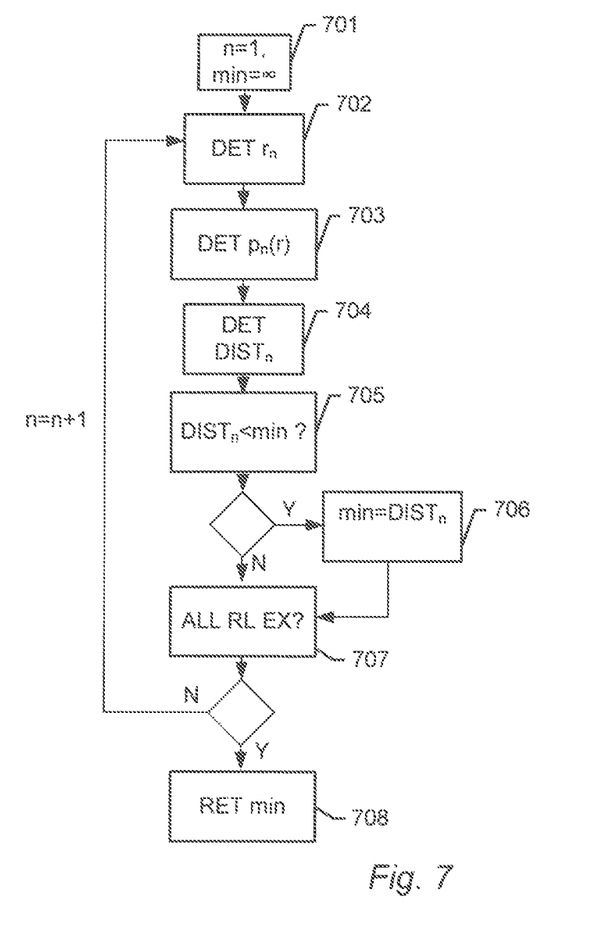
FIG. 7 shows a flowchart of a method for determining the smallest distance between any two range lines according to an embodiment of the present invention.

The method disclosed in relation to FIGS. 6 and 7 may be used to determine the smallest distance between any two range lines of a set of range lines in an N-dimensional phase space for any frequency set comprising a primary frequency (F0) and any number of secondary frequencies from 2 to N.

In some embodiments, the step of determining the smallest distance between any two range lines comprises the steps of selecting a point on a range line; and determining the distance from said selected point to the nearest range line.

Since all range lines pr. definition are parallel in the N-dimensional phase space and arranged with an equal distance to each other, the smallest distance between any two range lines may be determined by selecting a random point on a random range line, and determining the distance from the point to the nearest range line.

Consequently, a computational efficient way of estimating the minimum distance is provided.

In some embodiments, the selected point is the point corresponding to the range zero.

The point corresponding to the range zero is the same for all measurement setups i.e. as all phase differences will be zero. Consequently, the computations may be simplified.

In some embodiments, the distance from said selected point to the nearest range line is determined by determining the distance from the selected point to a plurality of range lines and selecting the smallest distance.

In some embodiments, the distances from the selected point to all range lines are determined.

When the distance from the selected point to all ranges are determined only distances above zero are considered (the distance from the selected point to its own range line is ignored)

According to a second aspect the invention relates to a method for selecting a frequency set for use in a multi frequency ranging method, comprising the steps of:

generating a plurality of candidate frequency sets;

determining a quality measure using a method as disclosed in relation to the first aspect of the invention for each of the plurality of candidate frequency sets;

selecting the frequency set of said plurality of frequency sets having the highest quality measure.

The plurality of candidate frequency sets may be generated in a random process i.e. the process may obtain a guess of a good frequency set and then apply random mutations to the guess. Preferably, all of the candidate frequency sets fulfil the same requirements e.g. has the same unambiguous range.

According to a third aspect the invention relates to a device configured to estimate the range to an object using a multi frequency ranging method using a first frequency set, said first frequency set comprising at least a primary frequency (F0), a first frequency (F1), and a second frequency (F2), wherein said device comprises:

a processing unit configured to obtain a quality measure for said first frequency set generated using a method as disclosed in relation to the first aspect of the invention; and a display operatively connected to said processing unit, wherein said processing unit further is configured to control said display to display said quality measure for said first frequency set.

Consequently, the user of the system may be provided with information on the quality of the used frequency set.

The processing unit may obtain the quality measure from a memory of the device. Alternatively, the processing unit may compute the quality measure. The device may be a radar comprising a transmitter/receiver configured to receive and transmit an electromagnetic signal. The device may be configured to estimate the range to the object using any multi frequency ranging method such as the methods disclosed in US20100103020 or co-filed PCT application having application number PCT/DK2015/050045, and filed on Mar. 4, 2015.

In some embodiments, the device is configured to use either said first frequency set or a second frequency set to determine the range to the object, wherein said second frequency set comprises more frequencies than said first frequency set, said device further comprises input means configured to allow a user to select either said first frequency set or said second frequency set for use for multi frequency ranging, wherein said processing unit further is configured to obtain a quality measure for said second frequency set generated using a method as disclosed in relation to the first aspect of the invention and control said display to display both said quality measure for said first frequency set and said second frequency set, whereby the user may use the quality factors to determine which frequency set to use.

Consequently, the user may select the frequency set fulfilling specific requirements.

Generally by using more frequencies the risk of range jumps is lowered as the number of dimensions of the phase space is increased, providing more 'space' for the range lines. However, the time it takes before a first range estimate is generated is also increased, since the radar has to transmit more frequencies before a range estimate can be generated.

The input means may be any input means such as a keyboard a computer mouse, a touch screen or the like.

In some embodiments, said device is configured to allow a user to select an unambiguous range, and said processing unit is configured to generate a frequency set corresponding to said selected unambiguous range, calculate a quality measure for said generated frequency set using a method as disclosed in relation to the first aspect of the invention, and control said display to display said calculated quality measure.

In some embodiments, said device is further configured to allow a user to select a number of phase differences to be used by the multi frequency method, wherein said processing unit is configured to generate a frequency set corresponding to said selected number of phase differences and said unambiguous range, calculate a quality measure for said generated frequency set using a method as disclosed in, relation to the first aspect of the invention and control said display to display said calculated quality measure.

In some embodiments, said device is further configured to allow a user to select a minimum frequency separation between any two frequencies used for determining a phase difference, and wherein said processing unit is configured to generate a frequency set corresponding to said selected number of phase differences, said unambiguous range and said minimum frequency separation, calculate a quality measure for said generated frequency set using a method as disclosed in relation to the first aspect of the invention, and control said display to display said calculated quality measure.

According to a fourth aspect the invention relates to a device configured to estimate the range to an object using a multi frequency ranging method, wherein said device is configured to use a first frequency set, said first frequency set comprising a primary frequency (F0), a first frequency (F1), a second frequency (F2), a third frequency (F3), a fourth frequency (F4), and a fifth frequency (F5) wherein the range to an object is estimated by
  determining a first phase difference descriptive of the phase difference between the primary frequency (F0') and the first frequency (F1') in a received echo signal reflected from the object;
  determining a second phase difference descriptive of the phase difference between the primary frequency (F0') and the second frequency (F2') in the received echo signal reflected from the object;
  determining a third phase difference descriptive of the phase difference between the primary frequency (F0') and the third frequency (F3') in the received echo signal reflected from the object;
  determining a fourth phase difference descriptive of the phase difference between the primary frequency (F0') and the fourth frequency (F4') in the received echo signal reflected from the object;
  determining a fifth phase difference descriptive of the phase difference between the primary frequency (F0') and fifth frequency (F5') in the received echo signal reflected from the object;
  determining the range to the object by processing said first, second, third fourth, and fifth phase difference;

wherein the first frequency (F1) is the frequency being closest to the primary frequency (F0), the total unambiguous range for the first frequency set is D times the individual unambiguous range for the first phase difference, and wherein the minimum distance between any two range lines is
  (a) above 44 degrees if D is between 200 and 333; or
  (b) above 40 degrees if D is between 333 and 666; or
  (c) above 35 degrees if D is between 666 and 1333; or
  (d) above 31 degrees if D is between 1333 and 2666; or
  (e) above 26 degrees if D is between 2666 and 4666.

Consequently, by using a high quality frequency set the risk of range jumps is lowered. By having a method for precisely evaluating the quality of frequency sets, a high quality frequency set may easily be found.

As mentioned, the total unambiguous range for the first frequency set D is given relative to the individual unambiguous range for the first phase difference. Thus, if the individual unambiguous range for the first phase difference is 150 m and D is 300, then the total unambiguous range for the first frequency set is 45 km.

Figure 5:
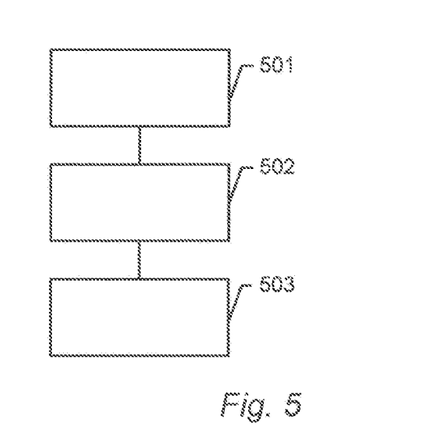
FIG. 5 illustrates how a frequency set having an unambiguous range R may be selected according to an embodiment of the present invention.

A frequency set fulfilling the above requirements may be generated using the method explained in relation to FIG. 5, and/or the second aspect of the present invention.

In some embodiments, the minimum distance between any two range lines is
  (a) above 67 degrees if D is between 200 and 333; or
  (b) above 55 degrees if D is between 333 and 666; or
  (c) above 47 degrees if D is between 666 and 1333; or
  (d) above 40 degrees if D is between 1333 and 2666; or
  (e) above 35 degrees if D is between 2666 and 4666.

Here and in the following, the term 'processing unit' is intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special-purpose electronic circuits, etc., or a combination thereof.

The different aspects of the present invention can be implemented in different ways including methods for generating a quality measure for a frequency set, methods for selecting frequency sets, and devices configured to estimate the range to an object using a multi frequency ranging method, described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependant claims.

Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1A:
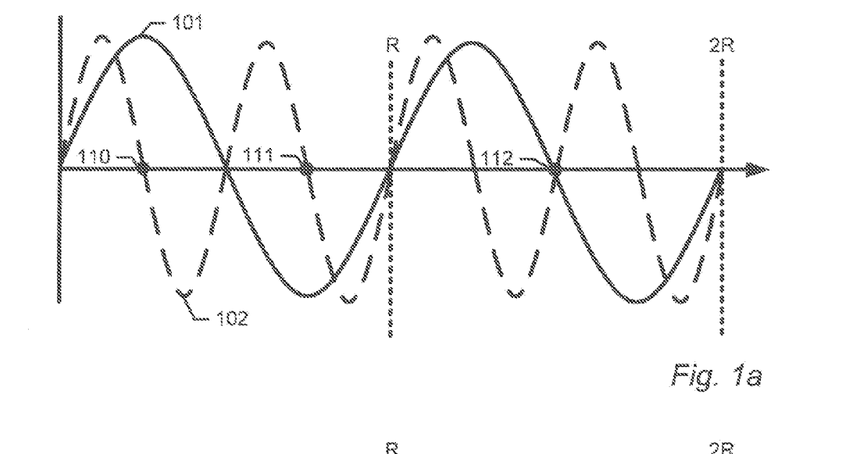
FIG. 1a-b illustrate the principle of multi frequency range estimation using two frequencies.
Figure 1B:
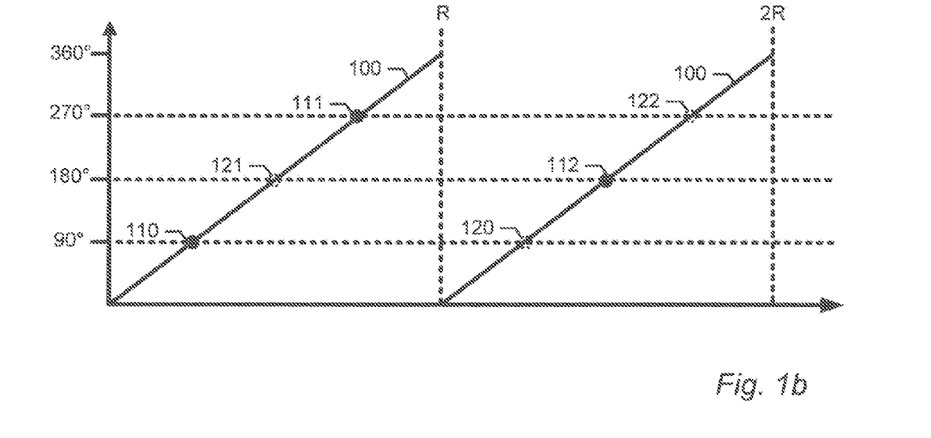

FIG. 1*a-b* illustrates the principle used in a multi frequency ranging system. FIG. 1*a* shows two frequencies 101 102 of a transmitted signal. The first frequency component 101 has a frequency F1 and the second frequency component 102 has a frequency 2*f1. The two frequencies 101 102 of the transmitted signal have been shown as two separate signals for making the principle more understandable. FIG. 1*b* shows the phase difference as a function of distance between the frequencies 101 102 of the signal. When the range increases the phase difference between the first and the second frequencies 101 102 increases linearly modulo 360 degrees, with a slope proportional to the frequency difference between the two frequency components i.e. f1. Thus when the transmitted signal is reflected by an object, the distance to that object can be found by looking at the phase difference between the two frequency components in the reflected signal.

As mentioned above, in the case of a single secondary frequency the unambiguous range is limited to R=0.5 c/(f2−f1), where c is the speed of the transmitted signal in the medium in which it propagates in e.g. the speed of light for an RF signal. This means that range values offset by an integer number of R yields exactly the same phase difference.

Shown in FIG. 1*a* is a first object 110 positioned with a distance of R/4, a second object 111 positioned with a distance of 3R/4, and a third object 112 positioned with a distance of 3R/2. From FIG. 1*b* it can be seen that a signal reflected by the first object 110 has a phase difference between the first and the second frequencies of 90 degrees and a signal reflected by the second object 111 has a phase difference between the first and the second frequencies of 270 degrees. Thus by looking at the phase difference between the first and second frequencies 101 102 of the received reflected signal the distance to the first and second object can be estimated.

However, a signal reflected by the third object 112 has a phase difference of 180 degrees apparently looking as if the third object 112 was positioned with a distance of R/2. Thus erroneous estimates results if objects are positioned outside the unambiguous range.

To get both a high unambiguous range, R, a good separation between the primary and the secondary frequency and an accurate range estimate, multiple frequencies can be used. This is achieved by transmitting a signal comprising at least three frequencies, where the frequencies are selected so that every distance within the range R has a unique associated point in phase space.

Figure 2A:
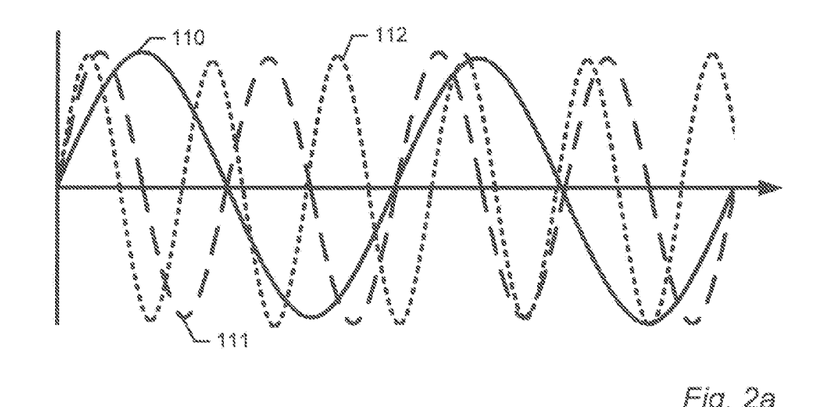
FIG. 2a-c illustrate the principle of multi frequency range estimation using more than two frequencies.
Figure 2B:
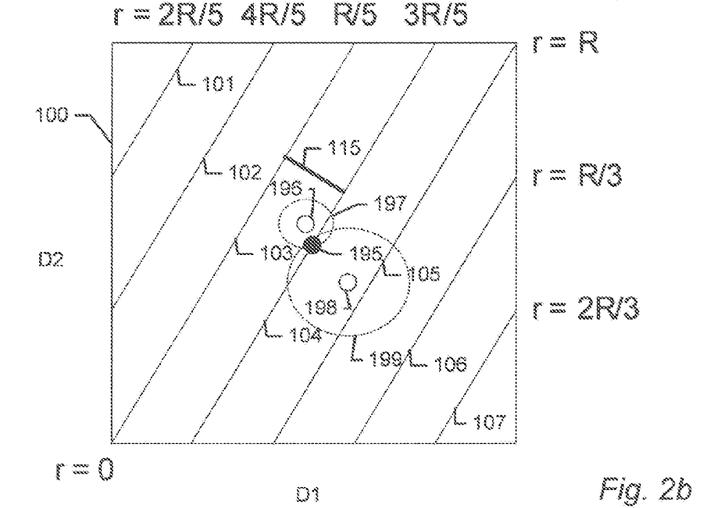
Figure 2C:
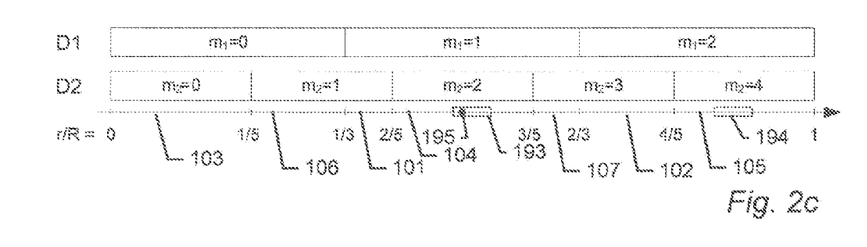

FIGS. 2*a-c* show an example for a frequency set comprising three frequencies according to an embodiment of the present invention. FIG. 2*a* shows a transmitted signal comprising a primary frequency 110, a first frequency 111, and a second frequency 112. The primary frequency 110 has a frequency f1, the first frequency 111 has a frequency 2*f1, and the third frequency has a frequency 8/3*f1. The three frequency components 110 111 112 of the transmitted signal have been shown as three separate signals for making the principle more understandable.

FIG. 2*b* shows the resulting phase space 100 when a first phase coordinate represents the (first) phase difference D1 between the primary frequency 110 and the first frequency 111, and a second phase coordinate represents the (second) phase difference D2 between the primary frequency 110 and the second frequency 112 in a reflected signal. In this example the frequency differences between the two frequencies 110 111 used to determined the first phase coordinate is f1, and the frequency difference between the two frequencies 110 112 used to determine the second phase coordinate is 5*f1/3. Thus the ratio between the two frequency differences is 3 to 5 (3,5). This makes the unambiguous range R=3*λ1=5*λ2, where λ1 and λ2 is the individual unambiguous range for each of the phase coordinates.

Thus a particular first phase difference may correspond to any one of three possible ranges within three range cells, and a particular second phase difference may correspond to any one of 5 possible ranges within 5 range cells.

The range cells represent the unambiguous range for the individual phase differences.

By choosing the frequency difference ratio between different phase differences carefully the unambiguous range can be extended to any distance without having to transmit and receive frequencies being very close.

This principle may be generalized to cases where more frequencies are transmitted e.g. if 3 phase coordinates are determined and the frequencies differences have a ratio of 3 to 4 to 5 (3, 4, 5) the unambiguous range becomes 3*λ1=4*λ2=5*λ3.

The phase space comprises seven range lines 101-107. The seven range lines 101-107 represent all possible combination of phase differences. Thus, each point on the ranges lines corresponds to a specific range within the unambiguous range. From FIG. 2*c* it can be seen that the range line 103 comprises associated points of candidate ranges within the interval from [0;R/5], the range line 106 comprises associated points of candidate ranges within the interval from [R/5; R/3], the range line 101 comprises associated points of candidate ranges within the interval from [R/3; 2R/5], the range line 104 comprises associated points of candidate ranges within the interval from [2R/5; 3R/5], the range line 107 comprises associated points of candidate ranges within the interval from [3R/5; 2R/3], the range line 102 comprises associated points of candidate ranges within the interval from [2R/3; 4R/5], and the range line 105 comprises associated points of candidate ranges within the interval from [4R/5; R].

In this example the smallest distance between any two range lines is 60 degrees. Thus 60 degrees in itself may be a quality measure for the frequency set. Alternatively, 60 degrees may be used as input in an algorithm. Below is provided an example of an algorithm:

$$Q = \frac{d}{2\sqrt{N}}$$

where d is the calculated smallest distance, and N is the number of phase differences used.

Shown in FIG. 2b is a point 195 on the range line 104 corresponding to a range R/2 to an object. However, in a real measurement situation, as a result of measurement noise, the determined first phase difference and the determined second phase difference will result in a measured point having an offset to the 'true' point 195. In FIG. 2b is shown a measured point 196 resulting from a measurement setup having a relative little amount of noise 197, and a measured point 198 resulting from a measurement setup having a relative large amount of noise 199. The measured point 196 is still closest to the correct range line 104, whereby a range is estimated typically falling within the box 193 shown in FIG. 2c. The exact estimated range depends on the specific used multi frequency ranging method but it will be close to the true range R/2. However, the measured point 198 is as a result of the measurement noise closer to the wrong range line 105, whereby a range is estimated typically falling within the box 194 shown in FIG. 2c. Thus, for the measured point 198 a range close to 9/10 R is estimated. This will be perceived as a range jump.

It is clear from this example that a multi frequency ranging method using a frequency set resulting in a phase space where the distance between the range lines is very small, will experience range jumps more frequently than a multi frequency ranging method using a frequency set resulting in a phase space where the distance between the range lines is larger (assuming the same amount of measurement noise).

Figure 3:
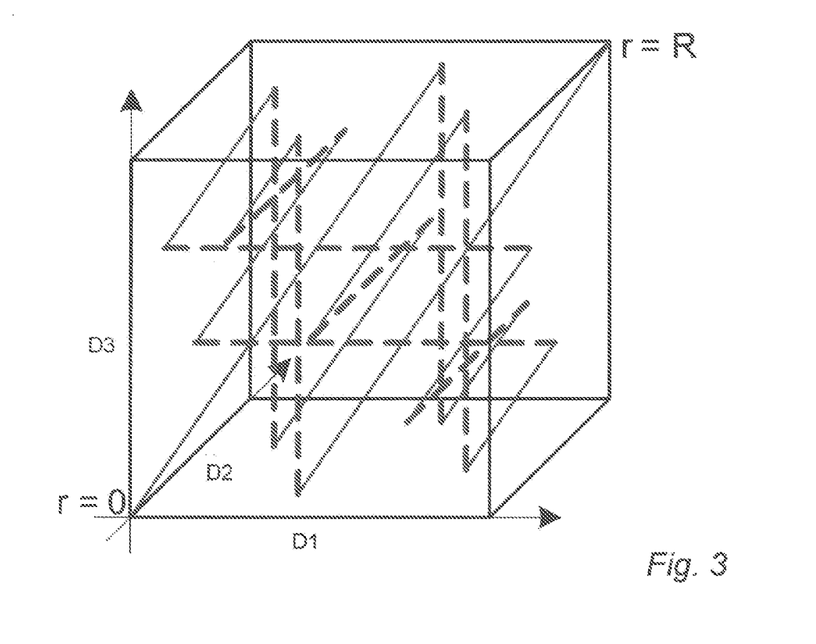
FIG. 3 shows a 3 dimensional phase space.

FIG. 3 shows an example of a three dimensional phase space comprising parallel range lines. In this example 3 phase differences D1, D2 and D3 are used and their frequency differences have a ratio of (3, 4, 5).

The dotted lines indicate transitions from a phase value of 1 to 0. E.g. follow the line segment from (0, 0, 0) to the top of the cube, where the dotted line takes you to the bottom of the cube. Here the second line segment starts and so on. The number of range lines is 10.

Figure 4:
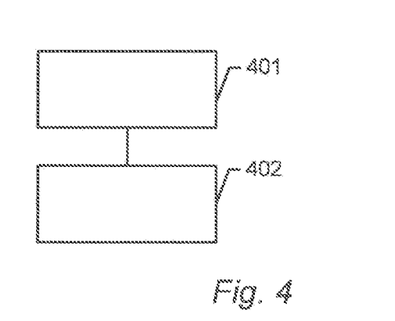
FIG. 4 shows a flow chart of a method for generating a quality measure for a frequency set according to an embodiment of the present invention.

FIG. 4 shows a flow chart of a method for generating a quality measure for a frequency set according to an embodiment of the present invention. In the first step 401 the smallest distance between any two range lines of a set of range lines in an N-dimensional phase space is determined. Next, in step 402 the determined smallest distance is used to generate the quality measure.

FIG. 5 illustrates how a frequency set having an unambiguous range R may be selected according to an embodiment of the present invention. In the first step 501 a guess of a good frequency set is made. Typically there is a constraint on the minimum distance between the primary frequency (F0) and the closest secondary frequency (F1). Thus, the first secondary frequency F1 is given by this constraint. The constraint result in an unambiguous range $\lambda 1$ for the phase difference between F0 and F1 which is equal to $\lambda 1 = c/2(F1-F0)$, where c is the speed of the signal in the medium in which it propagates in e.g. the speed of light for an RF signal. Typically it is advisable to select the frequency set in a manner so that the first phase difference comprises as few range cells as possible. The minimum number range cells for the first phase difference is $R/\lambda 1$ (if the number is not an integer is should be rounded up). Next, to determine the other secondary frequencies, a number of range cells may simply be selected for each of the other secondary frequencies (each being different and higher than $R/\lambda 1$), and the resulting frequencies calculated.

As an example, if F0-F1=1 MHz, and the speed of light is $3*10^8$ m/s then $\lambda 1=150$ m. If an unambiguous range of 1.5 km is desired and three phase differences are to be used, the first phase difference must comprise 10 range cells. Then, to find the other secondary frequencies a number of range cells may simply be selected for the other phase differences e.g. the second phase difference may comprises 11 range cells and the third phase difference may comprise 15 range cells. This makes the frequency difference ratio between the secondary frequencies (10, 11, 15). Thus, the second secondary frequency becomes F0+(11/10)*F1 , and the third secondary frequency becomes F0+(15/10)*F1.

Next, in step 502 based on the guess of a good frequency set, a plurality of alternative frequency sets are generated. This may be done by performing random mutations or an extensive search within a delimitated area. Then in step 503 for each of the plurality of frequency sets a quality measure is generated as explained previously. Finally, in step 503 the frequency set having the best quality measure is selected.

Specifically, a good guess of a good frequency set comprising five frequencies may be generated by selecting the frequency difference ratio between the secondary frequencies to be $(N, N+1, N+\sqrt[4]{\sqrt{N}}+1, N+\sqrt{N}+\sqrt[4]{\sqrt{N}}+1, N+\sqrt[4]{\sqrt{N^3}}+\sqrt{N}+\sqrt[4]{\sqrt{N}}+1)$ i.e. if $\lambda 1=150$ m and a total unambiguous range of 38 400 m is needed, the frequency difference ratio becomes (256,257, 261, 277, 341).

FIGS. 6 and 7 show how the smallest distance between any two range lines of a set of range lines in an N-dimensional phase space may be found for a given frequency set.

Each range line corresponds to a unique combination of range cells. To determine the minimum distance between any two range lines it may be useful to know the unique combination of range cells for each range line. This is done in the method explained in relation to FIG. 6.

The method determines a plurality of M vectors, one for each range line, where an M vector specify the combination of range cells unique for the particular range line, thus the M vector (1, 3) for a particular range line specify that the first phase difference is in the second range cell and the second phase difference is in the fourth range cell. Thus the M vector for the first range line will only comprise zeros, since the first range line pr. definition will have all phase differences in the first range cell.

The method starts with setting the counter n to 1. Next, in step 602 the M vector for the first range line, $M_0$, is initiated. As explained above, the first M vector is always a zero vector. The size of the M vectors corresponds to the number of phase differences i.e. the dimension of the phase space. Next a vector A is initiated. A is initiated to:

$$A=(1/v_1, 1/v_2, \ldots, 1/v_N)$$

where $v_n$ specify the number of range cells for the n'th phase difference in the chosen measurement setup, given by the frequency difference ratios. In the example shown in FIG. 2a-c, the frequency difference ratio between the first phase difference and the second phase difference is 3 to 5 thus v1=3, v2=5 and N=2, making A=(1/3, 1/5).

Next, a copy of the original version of the A vector is stored in the vector A_org, in step 604. Then, in step 606 the counter k is set to be zero and the variable min is set to be infinite. Then in step 607 it is examined whether the k'th value of the A vector is smaller than the value min. If the k'th value of the A vector is smaller than the value min, the method continues to step 608 and sets min to be equal the k'th value of the A vector, saves the value of k as the variable b, and continues to step 609. If the k'th value of the A vector is not smaller than the value min, the method skips step 608 and goes directly to step 609. In step 609 the method determines whether k is equal to N−1, where N is the number of phase coordinates used e.g. the method checks whether all values of the A vector has been examined. If k is not equal to N−1, the method returns to step 607 and increment the counter k by one. If k is equal to N−1 the method continues to step 610 where it determines whether min is equal to 1. If min is equal to 1 it means that an M vector has been created for all range lines, and the method terminates 614. If min is not equal to 1, it means that not all M vectors have been created and the method continues to step 611, where the M vector for the n'th range lines is initiated by setting it to be equal to the M vector for N−1'th range line. Next, in step 612 the b'th value of the M vector for the n'th range lines is increased by one, and the b'th value of the A vector is set to be increased by the b'th value of the vector A_org. Finally, the method returns to step 606 and increases n by one, to create the M vector for the next range line.

The method only needs to know the number of phase differences used, and the frequency difference ratio between the phase differences (to generate the A vector), these information are directly derivable from the chosen measurement setup. The method does not need to know the number of range lines before it is started.

Figure 8:
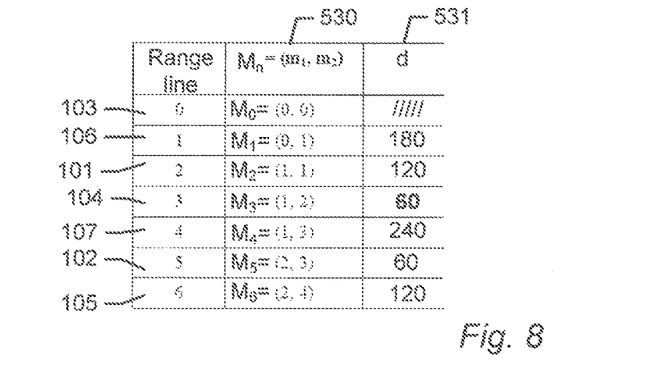
FIG. 8 shows a table comprising intermediate results.

The table in FIG. 8 shows, in the first column 530, the m-vectors for the seven range lines shown in FIG. 2b. The first range line 103 has the M vector (0,0), the second range line 106 has the M vector (0,1), the third range line 101 has the M vector (1,1), the fourth range line 104 has the M vector (1,2), the fifth range line 107 has the M vector (1,3), the sixth range line 102 has the M vector (2,3), and the seventh range line 105 has the M vector (2,4). FIG. 2c shows the range cells of the different phase differences, and the range lines 101-107.

FIG. 7 shows a flowchart of a method for determining the smallest distance between any two range lines according to an embodiment of the present invention. The method selects the point on the first range line point corresponding to the range zero, and determines the smallest distance from that point to all range lines. As all range lines a parallel, the smallest distance may be found by finding the intersections between the range lines and a N−1 dimensional hyper plane, wherein the N−1 dimensional hyper plane is positioned so that the points on the first range line corresponding to the range zero is positioned in it, and arranged so that it is perpendicular to all range lines. The distance from the selected point to the intersections corresponds to the smallest distance. The method starts in step 701, by setting the counter n to one and the variable min to infinite. Next in step 702, for the n'th range line the range $r_n$ on the n'th range line having the associated point positioned in the first N−1 dimensional hyper plane is found, note that the first range line is skipped since that is the range line the selected point is positioned on.

This candidate range may be found using equation (1)

$$r_n/R = \frac{\sum_{i=1}^{N}(M_n(i)) \cdot v_i}{\sum_{i=1}^{N} v_i^2} \tag{1}$$

where, R is unambiguous range for the chosen measurement setup, N is the number of phase differences used, $M_n$ is the M vector for the n'th range line and $v_i$ specify the number of range cells for the i'th phase difference in the chosen measurement setup, given by the frequency difference ratio between the used the phase differences. Then in step 704 the associated point in phase space for $r_n/R$ is determined. This point may be determined using equation (2)

$$\varphi a_{i,n} = v_i \cdot (r_n/R) - M_n(i) \tag{2}$$

where $\varphi a_{i,n}$ is the i'th phase coordinate of the point. Then, in step 704 the distance in degrees between the selected point and the point on the n'th range line being closest to the selected point measure point is determined. This distance may be determined using equation (3).

$$d(r) = 360 * \text{sqrt}(\Sigma_{i=1}^{N}(\varphi a_{i,n})^2) \tag{3}$$

Next, in step 705 the method examines whether the determined distance is smaller than the variable min. If the determined distance is smaller than the variable min, the method goes to step 706, where it sets min to be equal to the determined distance for the n'th range line, and continues to step 707. If the determined distance is not smaller than the variable min, the method skips step 706 and goes directly to step 707. In step 707 the method determines whether all range lines has been examined, this may be done by determining whether n+1 is equal to the number of M vectors. If the method determines that not all range lines has been examiner the method returns to step 702 and increments n by 1. If all range lines has been examined the method terminates in step 708, and the value of min is returned as the determined smallest distance between any two range lines.

Figure 9:
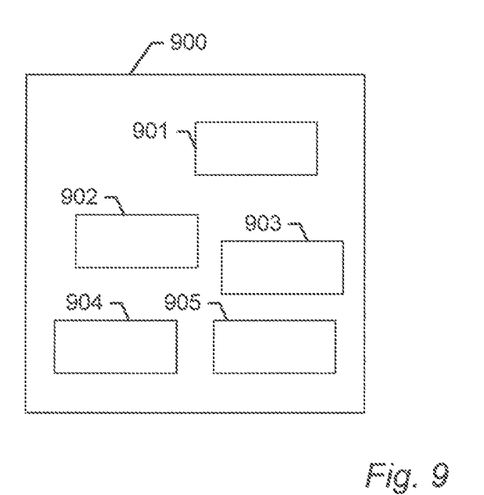
FIG. 9 shows a schematic drawing of a device for estimating the range to an object according to an embodiment of the present invention.

FIG. 9 shows a schematic drawing of a device 900 configured to estimate the range to an object using a multi frequency ranging method using a first frequency set, according to an embodiment of the present invention. The device comprises a processing unit 901, a display 902, an input means 903, a transmitter 904 and a receiver 905. The processing unit 902 is configured to obtain a quality measure for said first frequency set generated using a method as disclosed in relation to the first aspect of the invention. The display 902 is be operatively connected to said processing unit, and the processing unit 901 is further configured to control the display 902 to display the quality measure for the first frequency set.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method for generating a quality measure for a frequency set for indicating the quality of said frequency set for use in a multi frequency ranging method, said frequency set comprising at least a primary frequency (F0), a first frequency (F1), and a second frequency (F2), said multi frequency ranging method being a method for estimating the range to an object by determining at least a first phase difference and a second phase difference in a received reflected echo signal and processing said first phase difference and said second phase difference, said first phase difference being the phase difference between the primary frequency (F0') and the first frequency (F1') in the received reflected echo signal and said second phase difference being the phase difference between the primary frequency (F0') and the second frequency (F2') in the received reflected echo signal, wherein said method for generating a quality measure comprises the steps of:

determining the smallest distance between any two range lines of a set of range lines in an N-dimensional phase space, wherein the N-dimensional phase space comprises at least a first dimension representing the first phase difference, and a second dimension representing the second phase difference, said N-dimensional phase space having a dimension equal to the number of phase differences used by the multi frequency ranging method, said range lines representing all theoretical possible combinations of the first phase difference, the second phase difference, and N phase differences, used by said multi frequency method, each point on a range line corresponding to a specific range to an object within the unambiguous range of the multi frequency ranging method;

determining a quality measure for said specific frequency set based on the determined smallest distance.

2. A method according to claim 1, wherein the step of determining the smallest distance between any two range lines comprises the steps of selecting a point on a range line; and determining the distance from said selected point to the nearest range line.

3. A method according to claim 2, wherein the selected point is the point corresponding to the range zero.

4. A method according to claim 2, wherein the distance from said selected point to the nearest range line is determined by determining the distance from the selected point to a plurality of range lines and selecting the smallest distance.

5. A method according to claim 4, wherein the distances from the selected point to all range lines are determined.

6. A method for selecting a frequency set for use in a multi frequency ranging method, comprising the steps of:

generating a plurality of candidate frequency sets;

determining a quality measure using a method according to claim 1 for each of the plurality of candidate frequency sets;

selecting the frequency set of said plurality of frequency sets having the highest quality measure.

7. A device configured to estimate the range to an object using a multi frequency ranging method using a first frequency set, said first frequency set comprising at least a primary frequency (F0), a first frequency (F1), and a second frequency (F2), wherein said device comprises:

a processing unit configured to obtain a quality measure for said first frequency set generated using a method according to claims 1 to 5; and a display operatively connected to said processing unit, wherein said processing unit further is configured to control said display to display said quality measure for said first frequency set.

8. A device according to claim 7, wherein the device is configured to use either said first frequency set or a second frequency set to determine the range to the object, wherein said second frequency set comprises more frequencies than said first frequency set, said device further comprises input means configured to allow a user to select either said first frequency set or said second frequency set for use for multi frequency ranging, wherein said processing unit further is configured to obtain a quality measure for said second frequency set generated using a method according to claim 1 and control said display to display both said quality measure for said first frequency set and said second frequency set, whereby the user may use the quality factors to determine which frequency set to use.

9. A device according to claim 7, wherein said device is configured to allow a user to select an unambiguous range, and said processing unit is configured to generate a frequency set corresponding to said selected unambiguous range, calculate a quality measure for said generated frequency set using a method according to claim 1, and control said display to display said calculated quality measure.

10. A device according to claim 9, wherein said device is further configured to allow a user to select a number of phase differences to be used by the multi frequency method, wherein said processing unit is configured to generate a frequency set corresponding to said selected number of phase differences and said unambiguous range, calculate a quality measure for said generated frequency set using a method according to claim 1 and control said display to display said calculated quality measure.

11. A device according to claim 10, wherein said device is further configured to allow a user to select a minimum frequency separation between any two frequencies used for determining a phase difference, and wherein said processing unit is configured to generate a frequency set corresponding to said selected number of phase differences, said unambiguous range and said minimum frequency separation, calculate a quality measure for said generated frequency set using a method according to claim 1, and control said display to display said calculated quality measure.

12. A device configured to estimate the range to an object using a multi frequency ranging method, wherein said device is configured to use a first frequency set, said first frequency set comprising a primary frequency (F0), a first frequency (F1), a second frequency (F2), a third frequency (F3), a fourth frequency (F4), and a fifth frequency (F5) wherein the range to an object is estimated by determining a first phase difference descriptive of the phase difference between the primary frequency (F0') and the first frequency (F1') in a received echo signal reflected from the object;

determining a second phase difference descriptive of the phase difference between the primary frequency (F0') and the second frequency (F2') in the received echo signal reflected from the object;

determining a third phase difference descriptive of the phase difference between the primary frequency (F0') and the third frequency (F3') in the received echo signal reflected from the object;

determining a fourth phase difference descriptive of the phase difference between the primary frequency (F0') and the fourth frequency (F4') in the received echo signal reflected from the object;

determining a fifth phase difference descriptive of the phase difference between the primary frequency (F0') and the fifth frequency (F5') in the received echo signal reflected from the object;

determining the range to the object by processing said first, second, third, fourth, and fifth phase difference;

wherein the first frequency (F1) is the frequency being closest to the primary frequency (F0), the total unambiguous range for the first frequency set is D times the individual unambiguous range for the first phase difference, and wherein the minimum separation between any two range lines is:

(a) above 44 degrees if D is between 200 and 333; or
(b) above 40 degrees if D is between 333 and 666; or
(c) above 35 degrees if D is between 666 and 1333; or
(d) above 31 degrees if D is between 1333 and 2666; or
(e) above 26 degrees if D is between 2666 and 4666.

13. A device according to claim 12, wherein the minimum separation between any two range lines is:

(a) above 67 degrees if D is between 200 and 333; or
(b) above 55 degrees if D is between 333 and 666; or
(c) above 47 degrees if D is between 666 and 1333; or
(d) above 40 degrees if D is between 1333 and 2666; or
(e) above 35 degrees if D is between 2666 and 4666.

* * * * *